US006240597B1

(12) United States Patent
Mochizuki (10) Patent No.: US 6,240,597 B1
(45) Date of Patent: Jun. 5, 2001

(54) GROMMET HAVING A RESILIENT FLANGE

(75) Inventor: Yasunari Mochizuki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/312,477

(22) Filed: May 17, 1999

(30) Foreign Application Priority Data

May 20, 1998 (JP) .................................. 10-138617

(51) Int. Cl.$^7$ ...................................................... F16L 5/00
(52) U.S. Cl. .............................. 16/2.1; 16/2.2; 16/2.3; 174/152 G; 174/153 G
(58) Field of Search .............................. 16/2.1, 2.2, 2.5; 174/153 G, 65 G, 152 G, 152 R, 167

(56) References Cited

U.S. PATENT DOCUMENTS

| 3,243,835 | * | 4/1966 | Armentrout | 16/2.1 |
| 5,280,138 | * | 1/1994 | Preston | 174/152 G |
| 5,360,945 | * | 11/1994 | Truesdale | 174/65 R |
| 5,631,447 | * | 5/1997 | Smith | 174/260 |
| 6,058,562 | * | 5/2000 | Satou | 16/2.1 |

FOREIGN PATENT DOCUMENTS

| 0 888 931 A2 | 1/1999 | (EP) . |
| 8-212857 | 8/1996 | (JP) . |
| 10-261334 | 9/1998 | (JP) . |

OTHER PUBLICATIONS

Japanese Abstract of 07296659, Nov. 10, 1995.
Japanese Abstract of 11166669, Jun. 22, 1999.
Japanese Abstract of 09117040, May 2, 1997.

* cited by examiner

*Primary Examiner*—Anthony Knight
*Assistant Examiner*—Mark Williams
(74) *Attorney, Agent, or Firm*—Sughrue, Mion, Zinn, Macpeak & Seas, PLLC

(57) ABSTRACT

A grommet is provided for positively mounting a long member (e.g. a wire harness) in such a manner that the long member is passed through a mounting plate such as a panel of a vehicle body. A grommet for passing and holding a wire harness relative a mounting hole formed through a mounting plate includes a first cylindrical portion for passing the wire harness therethrough, a second cylindrical portion connected to the first cylindrical portion through a connection portion, a groove formed in an outer peripheral surface of the second cylindrical portion, and a flange portion formed on that portion of the outer peripheral surface of the second cylindrical portion lying between the groove and the connection portion. A plurality of guide portions, extending radially from the outer peripheral surface of the first cylindrical portion, are brought into contact with an inner peripheral edge of the mounting hole in such a manner that the second cylindrical portion is disposed coaxially with the mounting hole.

8 Claims, 12 Drawing Sheets

GROMMET HAVING A RESILIENT FLANGE

BACKGROUND OF THE INVENTION

1. Field of the Invention

This invention relates to a grommet, and more particularly to a grommet which enables a long member (e.g. a wire harness) to be positively and easily passed through and retained to a mounting plate such as a panel of a vehicle body.

2. Related Art

There have heretofore been proposed various grommets which enable a wire harness to be passed through and mounted on a panel of a car body of an automobile, and the Applicant of the present application has proposed a grommet (Japanese Patent Unexamined Publication No. 8-212857) which includes a smaller-diameter tubular portion for fitting on a wire harness, a larger-diameter tubular portion for fitting in a mounting hole, a tapering tubular portion interconnecting the smaller-diameter and larger-diameter tubular portions, and a groove edge portion and a holding piece portion which are provided at an outer peripheral surface of the larger-diameter tubular portion.

In this example, the larger-diameter tubular portion is turned inside out, with its inner peripheral surface directed outwardly, and by doing so, a peripheral edge portion of the holding piece portion is deformed into a tapering, cylindrical shape, and is passed through the mounting hole. Subsequently, the smaller-diameter portion is drawn into the mounting hole, and as a result, because of a resilient force tending to restore the holding piece into its initial shape, the larger-diameter portion is restored into its initial shape in such a manner that the groove edge portion is engaged in a peripheral edge of the mounting hole. Therefore, the wire harness can be easily and positively mounted with a relatively smaller force than other conventional grommets.

In the above conventional example, if the smaller-diameter portion is passed through the mounting hole with its axis disposed out of alignment with the axis of the mounting hole, when mounting the wire harness, there is a possibility that the groove is ill-fitted to the mounting hole so as to be in eccentric relation to the peripheral edge of this mounting hole.

Therefore, it has been desired to provide the type of grommet which enables the groove to be positively and easily fitted to the mounting hole in a proper condition.

SUMMARY OF THE INVENTION

This invention has been made in view of the above problems, and an object of the invention is to provide a grommet for positively mounting a longitudinally shaped member (e.g. a wire harness) in such a manner that the long member is passed through a mounting plate such as a panel of a vehicle body.

According to the invention, the above object has been achieved by a grommet for passing and holding a member relative to a mounting hole formed through a mounting plate, which comprises a first cylindrical portion for passing the member therethrough, a second cylindrical portion connected to the first cylindrical portion through an annular connection portion formed on an outer peripheral surface of the first cylindrical portion, a groove portion formed in an outer peripheral surface of the second cylindrical portion, and a flange portion formed on that portion of the outer peripheral surface of the second cylindrical portion lying between the groove portion and the connection portion. The second cylindrical portion is turned inside out, with its inner peripheral surface directed outwardly, so that a peripheral edge portion of the flange portion is inserted into the mounting hole, and then the second cylindrical portion is restored into its initial shape, so that the first cylindrical portion is passed through the mounting hole, and the groove portion is fitted on an inner peripheral edge of the mounting hole. A plurality of guide portions extend radially from the outer peripheral surface of the first cylindrical portion and the guide portions can be brought into contact with the inner peripheral edge of the mounting hole in such a manner that the second cylindrical portion is disposed coaxially with the mounting hole.

The first cylindrical portion need only to have an inner diameter corresponding to an outer diameter of the member such as a wire harness, and this inner diameter may be a little smaller so that the member can be press-fitted into the first cylindrical portion. This first cylindrical portion does not need to have a uniform inner diameter or a uniform outer diameter over the entire length thereof, and for example may a stepped, cylindrical shape or a tapering, cylindrical shape.

The connection portion need only to radially extend from the predetermined portion of the outer peripheral surface of the first cylindrical portion over the entire circumference thereof, and for example, this connection portion is formed into a flat ring-shape or a generally conical shape.

The second cylindrical portion need only to have an outer diameter corresponding to the inner diameter of the mounting hole, and the proximal end of this second cylindrical portion is connected to the peripheral edge of the connection portion.

Therefore, for example, the first cylindrical portion and the second cylindrical portion may be arranged in a telescopic manner, or may be serially arranged in the axial direction through the connection portion.

The first cylindrical portion, the connection portion and the second cylindrical portion may be formed integrally with one another, using a synthetic resin having a suitable degree of elasticity and water resistance. However, these portions may be separate from each other in so far as the second cylindrical portion can have a suitable degree of elasticity and water resistance.

The flange portion may comprise an annular flange, formed on the outer peripheral surface of the second cylindrical portion over the entire circumference thereof, or may comprise a plurality of flange portions spaced a predetermined distance from one another in the circumferential direction.

Each of the guide portions may comprise a plate disposed parallel to the axis of the first cylindrical portion, or may comprise a plate or a bar extending radially of the first cylindrical portion. These guide portions have the same length in the radial direction, and are arranged at equal intervals or unequal intervals in the circumferential direction.

In the grommet of this construction, when the plurality of guide portions, extending radially from the outer peripheral surface of the first cylindrical portion, are brought into contact with the inner peripheral edge of the mounting hole, the second cylindrical portion is disposed coaxially with the mounting hole, and therefore the groove portion is fitted properly to the mounting hole, and more specifically, the inner peripheral edge of the mounting hole, and therefore the above object is achieved.

In the present invention, if each of the guide portions has a plate-like shape, and is disposed parallel to the axis of the first cylindrical portion, the required strength can be obtained as compared with the case where each guide portion comprises a plate or a bar extending radially of the first cylindrical portion, and therefore the guide portions can positively guide the first cylindrical portion without being easily deformed.

In the present invention, if the guide portions are interconnected through a disk portion, corresponding to the mounting hole, or if the guide portions are interconnected through an annular portion, having a diameter corresponding to the diameter of the mounting hole, the strength of the guide portions can be further increased.

In the present invention, if the guide portions are tapering toward the open end of the first cylindrical portion, the guide portions can be easily inserted into the mounting hole.

In the present invention, an engagement portion may be formed on the outer peripheral surface of the second cylindrical portion, and tapered from the groove portion to the distal end of the second cylindrical portion.

In this grommet, the engagement portion, tapering from the groove portion toward the distal end, is formed beforehand, and therefore when the second cylindrical portion is inverted, the engagement portion tapers from the end of the inner peripheral surface in the axial direction.

Therefore, for example, in the case where a flange is formed on the peripheral edge portion of the mounting hole, the axis of the mounting hole is substantially aligned with the axis of the second cylindrical portion by the engagement portion when the inverted second cylindrical portion is fitted on this flange, and therefore the groove portion can be uniformly fitted in the inner peripheral edge of the mounting hole.

DETAILED DESCRIPTION OF THE INVENTION

Figure 1A:
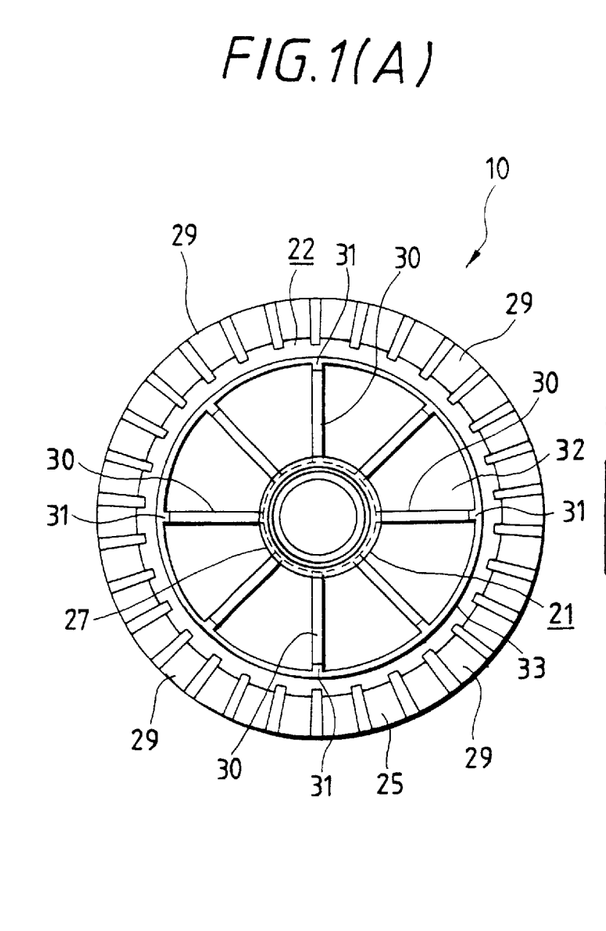
FIGS. 1(A) and 1(B) are a plan view and a cross-sectional view, respectively, of a grommet of a first embodiment.
Figure 11:
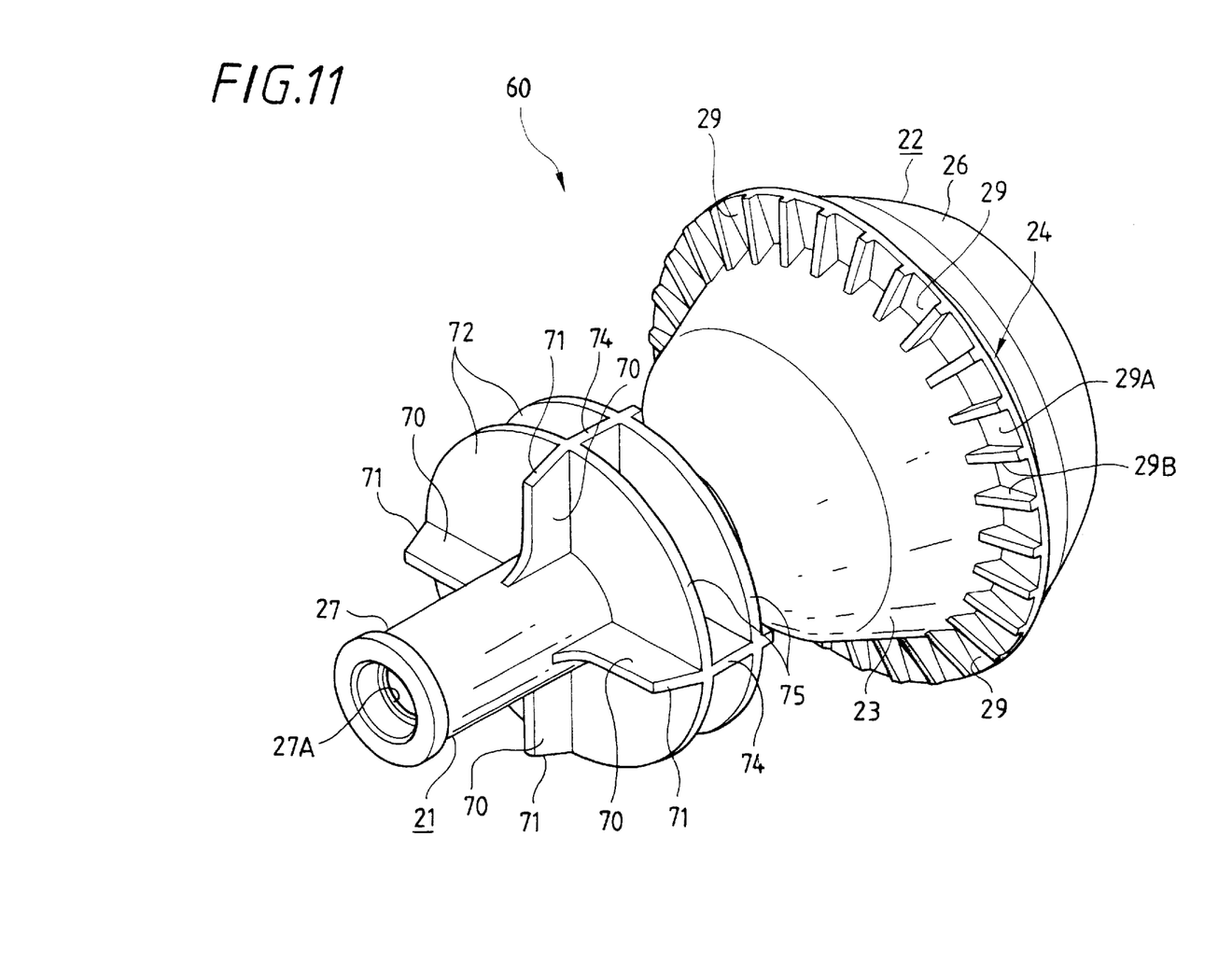
FIG. 11 is a perspective view showing the grommet of a third embodiment.
Figure 12:
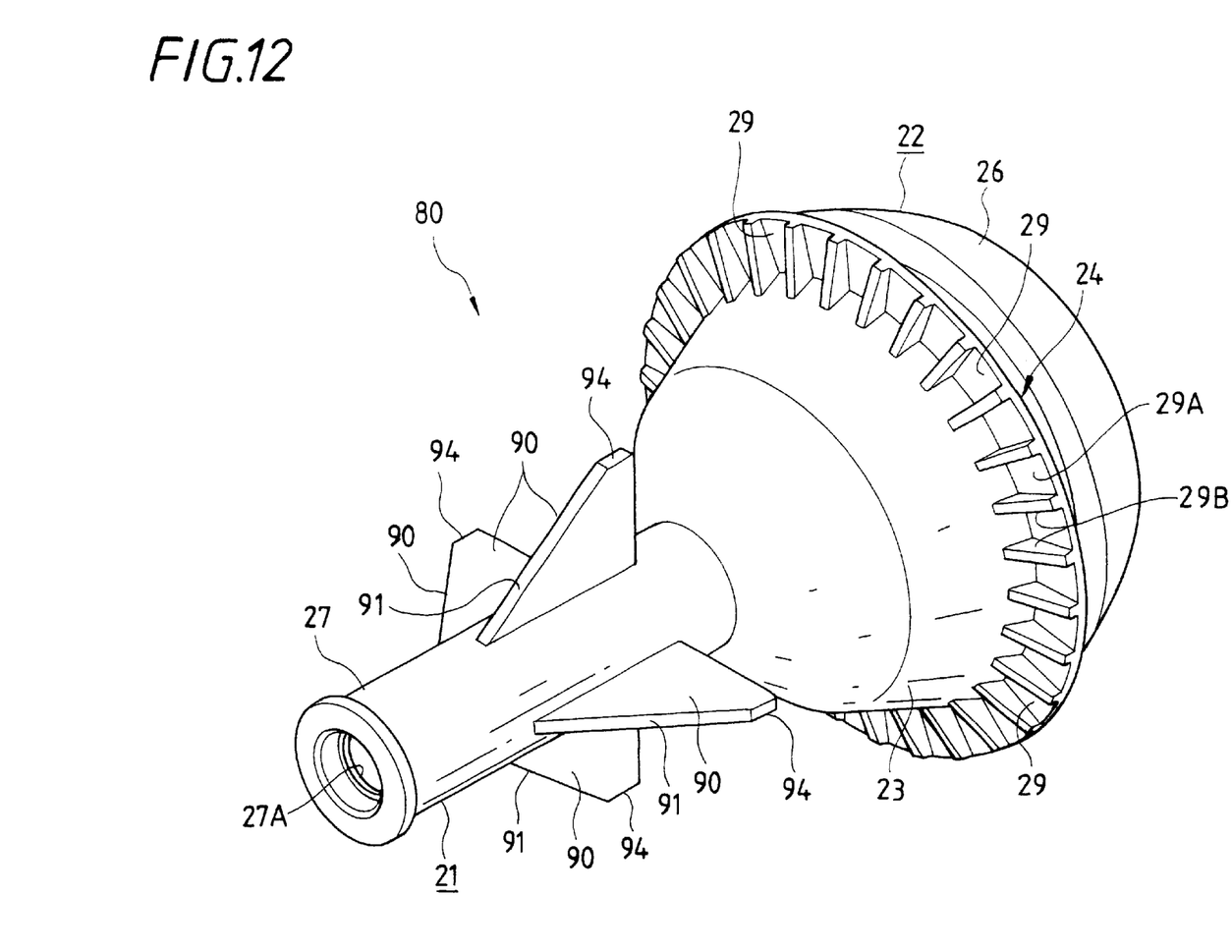
FIG. 12 is a perspective view showing the grommet of a fourth embodiment.

Embodiments of the present invention will now be described in detail with reference to the drawings. FIGS. 1(A) and (B) are a plan view and a cross-sectional view of a first embodiment of a grommet of the present invention, FIG. 2 is a perspective view showing the whole of the grommet of the first embodiment, FIGS. 3 to 7 are cross-sectional views showing the procedure of mounting the grommet of the first embodiment, FIGS. 8(A) and (B) are a plan view and a cross-sectional view of a second embodiment of a grommet of the invention, FIG. 9 is a perspective view showing the whole of the grommet of the second embodiment, FIG. 10 is a cross-sectional view showing the procedure of mounting the grommet of the second embodiment, FIG. 11 is a perspective view showing the whole of a grommet of a third embodiment, and FIG. 12 is a perspective view showing the whole of a grommet of a fourth embodiment.

Figure 1B:
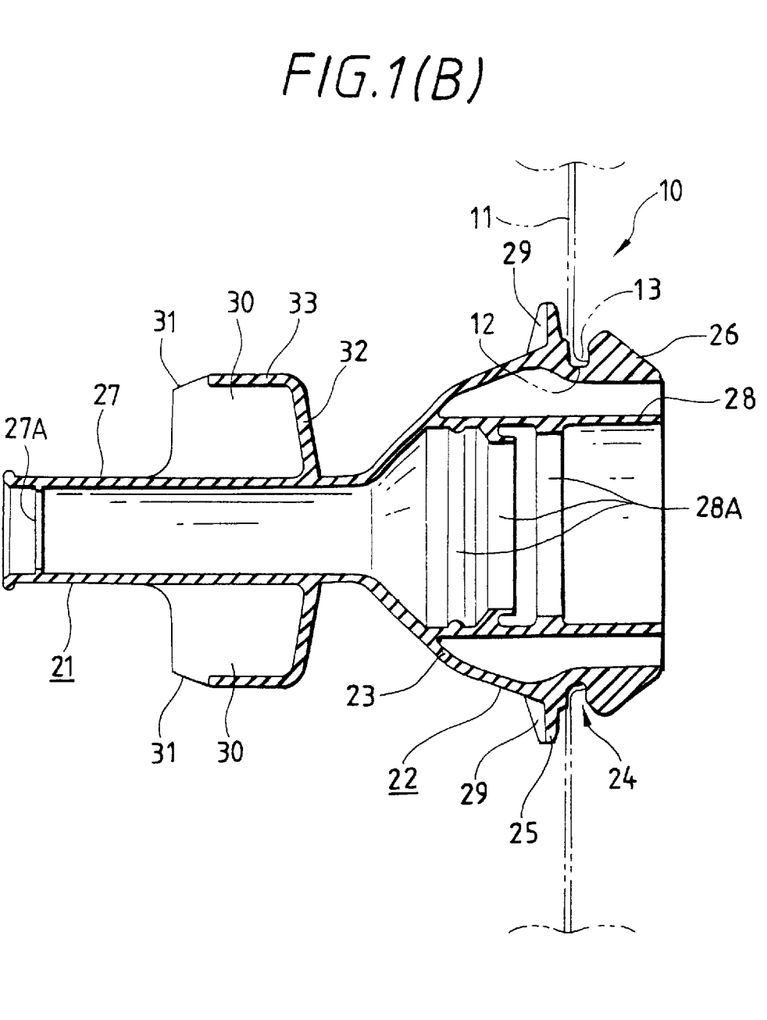
Figure 2:
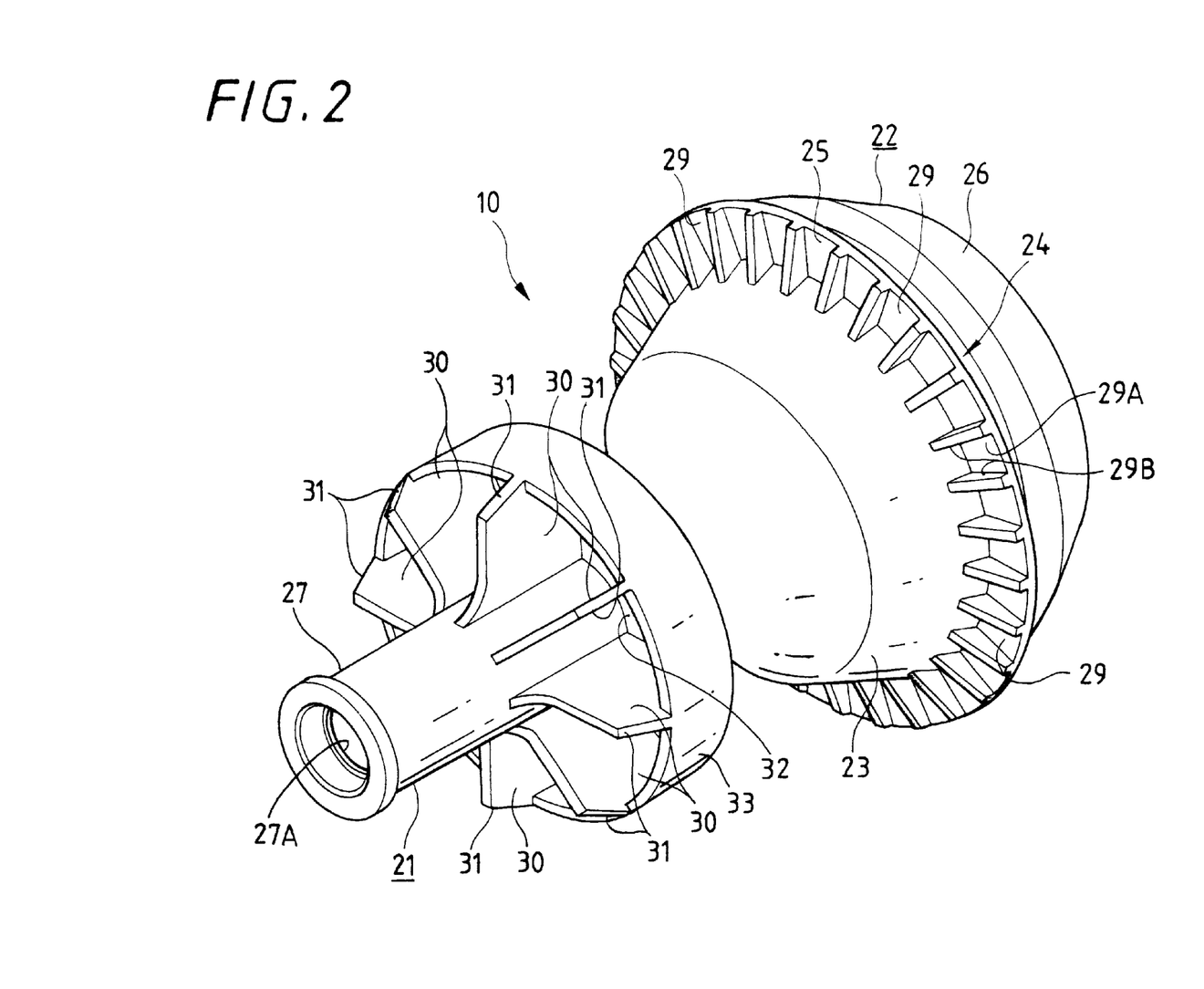
FIG. 2 is a perspective view showing the grommet of the first embodiment.

As shown in FIGS. 1(A), 1(B) and 2, in order that a wire harness (not shown) can be passed through and mounted on a car body panel 11 of an automobile, the grommet 10, according to the first embodiment of the present invention, can be fitted in a mounting hole 12, formed through the car body panel 11, with the wire harness passed through and held by this grommet. The mounting hole 12 has a circular shape, and a flange 13 of a predetermined height is formed on a peripheral edge of this mounting hole 12.

The grommet 10 includes a first cylindrical portion 21 for passing the wire harness therethrough, an annular connection portion 23 formed on an outer peripheral surface of the first cylindrical portion 21, a second cylindrical portion 22 connected to the first cylindrical portion 21 through the connection portion 23, a groove 24 formed in an outer peripheral surface of the second cylindrical portion 22, a flange portion 25 formed on that portion of the outer peripheral surface of the second cylindrical portion 22 lying between the groove 24 and the connection portion 23, and a tapering engagement portion 26 formed on that portion of the outer peripheral surface of the second cylindrical portion 22 extending from the groove 24 to an open end of the second cylindrical portion 22.

The grommet 10 is made of a synthetic resin having a suitable degree of elasticity and water resistance, and the first cylindrical portion 21 and the second cylindrical portion 22 are formed integrally with each other.

The first cylindrical portion 21 is formed into a stepped configuration, and has a smaller-diameter portion 27 and a larger-diameter portion 28 which are continuous with each other along a common axis.

The smaller-diameter portion 27 has an inner diameter corresponding to the outer diameter of the wire harness, and an annular rib 27A is formed on an inner peripheral surface thereof.

When the wire harness is press-fitted into the smaller-diameter portion 27, the rib 27A is elastically deformed, and is held in intimate contact with the outer peripheral surface of the wire harness, so that the smaller-diameter portion 27 holds the wire harness in an airtight manner.

The larger-diameter portion 28 has an inner diameter larger than the inner diameter of the smaller-diameter portion 27, and a plurality of annular ribs 28A are formed on an inner peripheral surface of the larger-diameter portion 28.

After the wire harness is press-fitted into the grommet, a predetermined filler is filled in the larger-diameter portion 28, and is solidified, so that the larger-diameter portion 28 holds the wire harness in an airtight manner.

The connection portion 23 is formed into a generally conical shape spreading from the boundary between the smaller-diameter portion 27 and the larger-diameter portion 28 toward the open end of the larger-diameter portion 28.

The second cylindrical portion 22 has an outer diameter corresponding to the diameter of the mounting hole 12, and has an inner diameter larger than the outer diameter of the larger-diameter portion 28, and this second cylindrical portion 22 is connected to the connection portion 23. Therefore, the larger-diameter portion 28 is provided within the second cylindrical portion 22 in generally telescopic relation thereto, with a predetermined space formed therebetween.

The groove 24 for fitting on the flange 13 of the mounting hole 12 has a generally channel-shaped cross-section, and is formed over the entire circumference of the second cylindrical portion 22, and is disposed in a plane perpendicular to the axis of the second cylindrical portion 22.

The flange portion 25 has a diameter larger than the diameter of the mounting hole 12, and is formed adjacent to the groove 24 over the entire circumference of the second cylindrical portion 22, and is disposed in a plane perpendicular to the axis of the second cylindrical portion 22. The flange portion 25 has a plurality of radially-extending recesses 29 arranged on the conical surface extending toward the connection portion 23, and has a generally differential gear-shape (see FIG. 2).

Each recess 29 has a generally rectangular cross-section (see FIG. 3), and is defined by a bottom surface 29A and a pair of adjacent wall surfaces 29B, 29B disposed perpendicular to the bottom surface 29A.

The engagement portion 26 is formed over the entire circumference of the second cylindrical portion 22, and is disposed in a plane perpendicular to the central axis of the second cylindrical portion 22. This engagement portion 26 is formed into a generally conical shape.

According to the present invention, this grommet 10 has eight guide portions 30 extending radially outwardly from the outer peripheral surface of the first cylindrical portion 21. Each of the guide portions 30 has a plate-like shape, and is disposed on a plane so as to be parallel to the central axis of the first cylindrical portion 21. The guide portions 30 are spaced 45 degrees from one another in the direction of the circumference of the first cylindrical portion 21, and have respective chamfered portions 31 tapering or slanting toward the open end of the first cylindrical portion 21.

These guide portions 30 each have the same length in the radial direction, and are interconnected through a disk portion 32 and an annular portion 33 having diameters which correspond to the diameter of the mounting hole 12. When the guide portions 30 are brought into contact with the inner peripheral edge of the mounting hole 12 through the annular portion 33, the second cylindrical portion 22 is disposed coaxially with the mounting hole 12.

Next, the procedure of mounting the wire harness by the use of this grommet 10 will be described.

First, the wire harness is passed through the first cylindrical portion 21 of the grommet 10, and the predetermined filler is filled in the larger-diameter portion 28, and is solidified.

Figure 3:
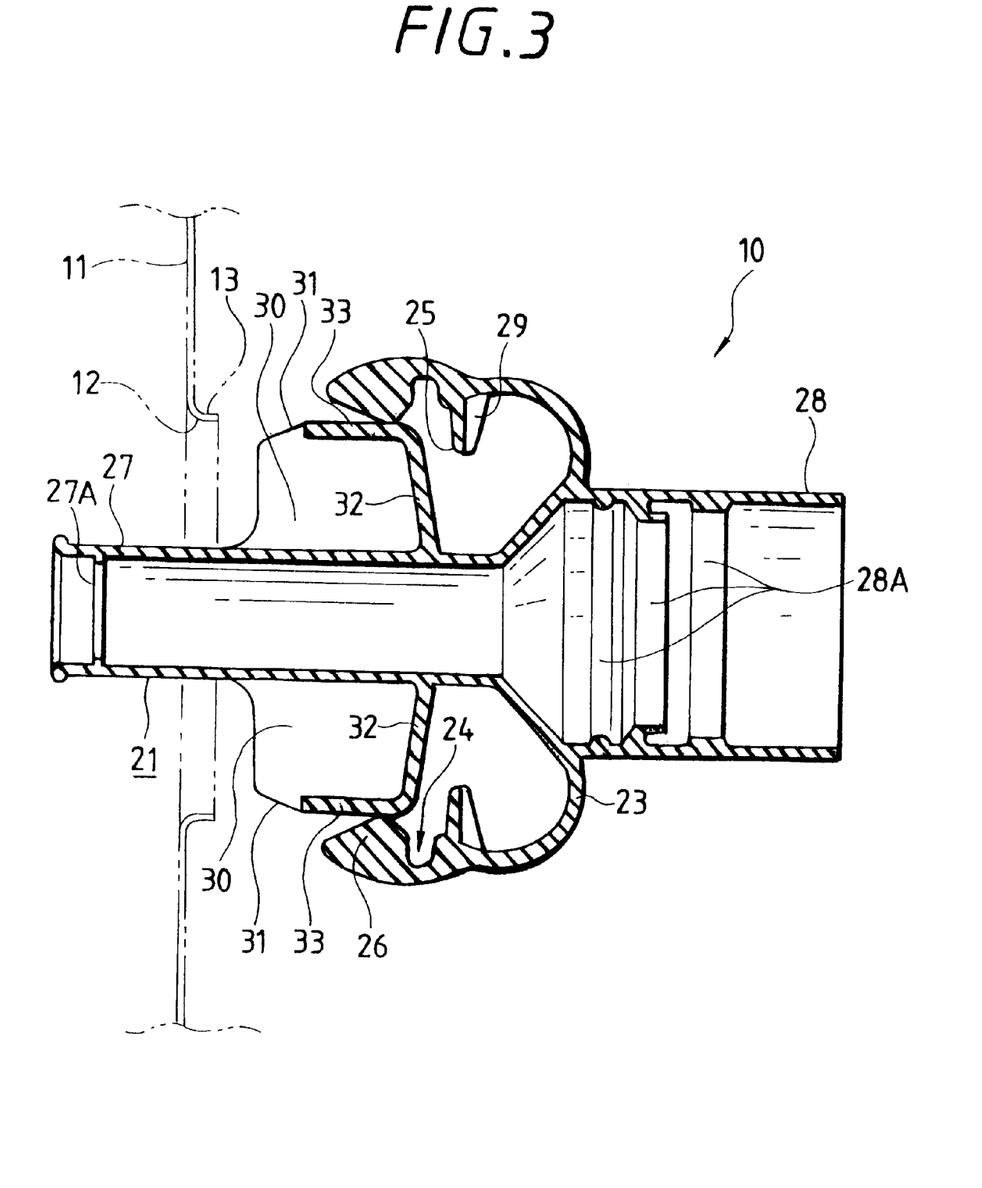
FIG. 3 is a cross-sectional view showing the initial procedure of mounting the grommet of the first embodiment.

Then, as shown in FIG. 3, the second cylindrical portion 22 is turned inside out relative to the first cylindrical portion 21 at the portion adjacent to the connection portion 23, so that the inner peripheral surface of the second cylindrical portion 22 is directed outwardly, and also the flange portion 25 is reduced in diameter, with its peripheral edge directed inwardly.

As shown in FIG. 2, the flange portion 25 has an initial shape so that the bottom surface 29A is disposed perpendicular to the wall surfaces 29B and 29B. However, as the inversion of the second cylindrical portion 22 proceeds, the bottom surface 29A is curved or deformed, so that the wall surfaces 29B and 29B move toward each other, and as a result, regular radial wrinkles are formed on this flange portion, and this flange portion is reduced in diameter.

As the inversion of the second cylindrical portion 22 proceeds, the inner peripheral surface thereof, which is originally the outer peripheral surface, is tapered from its open end toward the connection portion 23 because of the provision of the engagement portion 26, and the engagement portion 26 is brought into contact with the annular portion 33.

Figure 4:
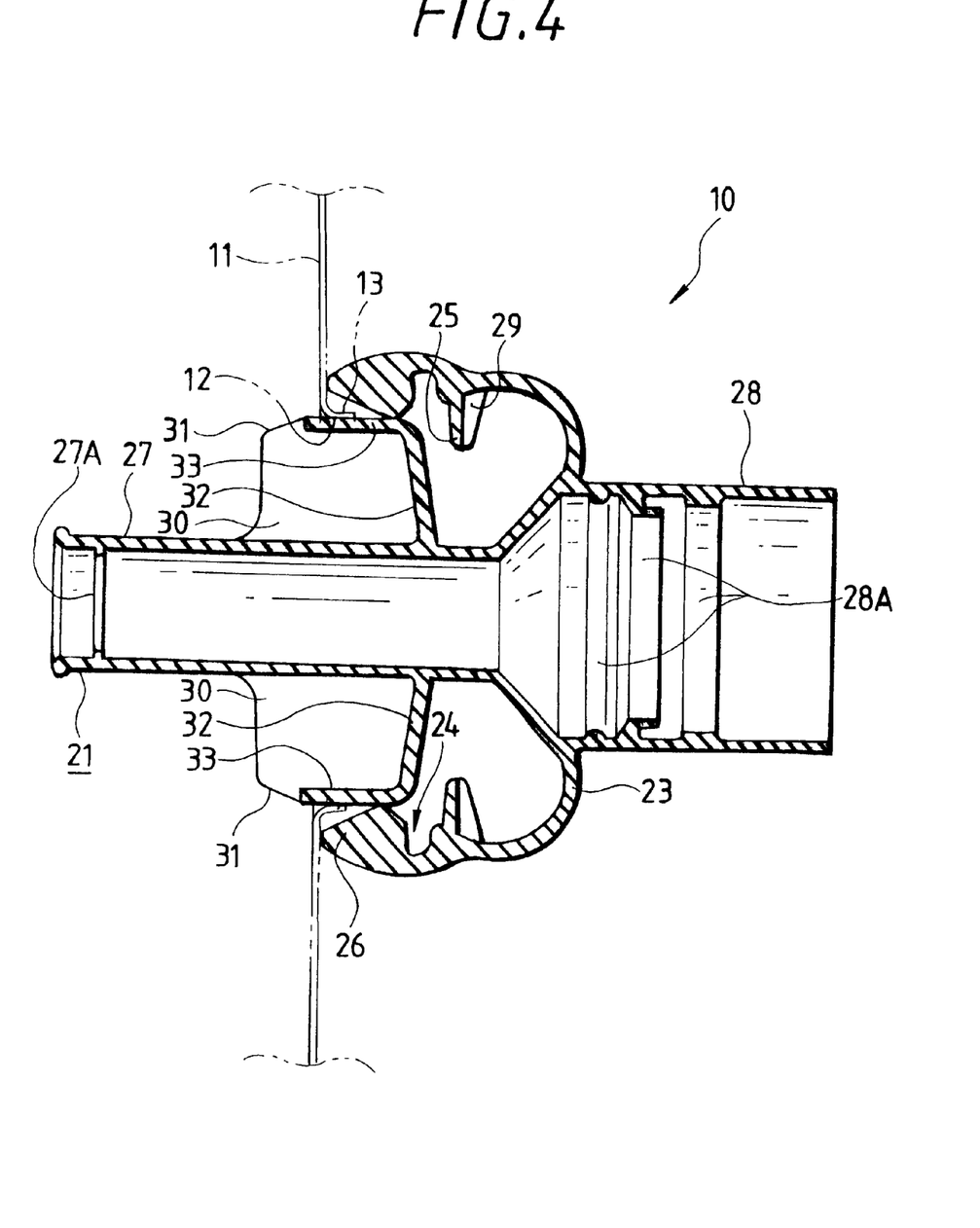
FIG. 4 is a cross-sectional view showing the procedure of mounting the grommet of the first embodiment.

Then, as shown in FIG. 4, the first cylindrical portion 21 are brought into contact with the inner peripheral edge of the mounting hole 12 through the annular portion 33.

At this time, since the guide portions 30 are tapered due to the provision of the chamfered portions 31, the guide portions 30 are guided into contact with the inner peripheral edge of the mounting hole 12, so that the first cylindrical portion 21 is positively disposed coaxially with the mounting hole 12.

The engagement portion 26 of the second cylindrical portion 22 is already held in contact with the annular portion 33, and therefore, when the first cylindrical portion 21 is moved axially with the outer peripheral surface of the annular portion 33 held in sliding contact with the inner peripheral edge of the mounting hole 12, the engagement portion 26 and the annular portion 33 are so arranged that the flange 13 is interposed therebetween.

Therefore, the second cylindrical portion 22 is also disposed coaxially with the mounting hole 12.

Thereafter, in a condition in which the open end of the second cylindrical portion 22 is held against the car body panel 11, the wire harness (not shown) is pulled relative to the car body panel 11 in a left-hand direction (in reference to the drawings), thereby withdrawing the guide portions 30 from the mounting hole 12 while deforming the second cylindrical portion 22 into a generally U-shaped cross-section so as to restore it into its initial shape.

At this time, since the wire harness is held or retained by the first cylindrical portion 21 through the filler, there is no fear that the wire harness, even if pulled in the left-hand direction (in the drawings), is disengaged from the first cylindrical portion 21.

Figure 5:
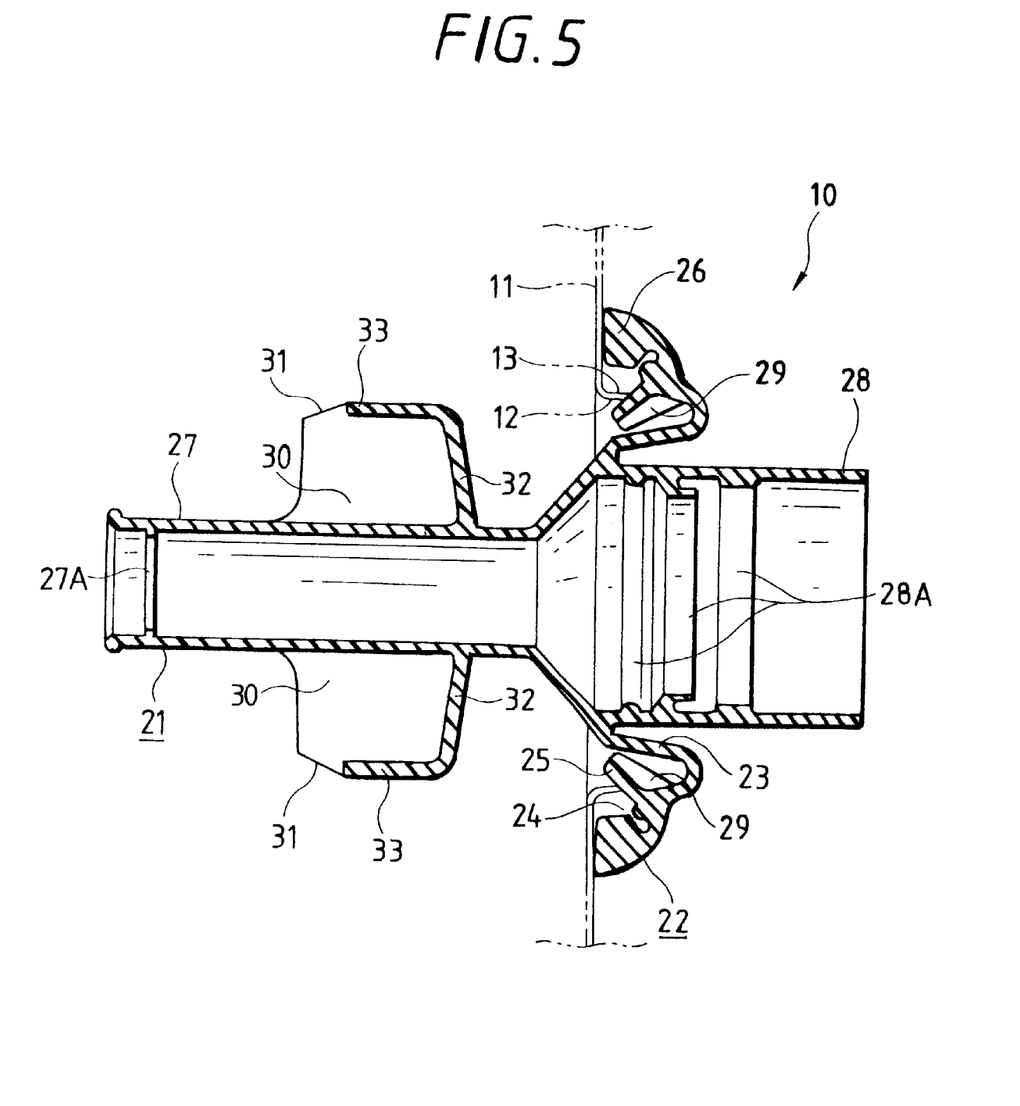
FIG. 5 is a cross-sectional view showing the procedure of mounting the grommet of the first embodiment.

Then, as shown in FIG. 5, the wire harness is further pulled in the left-hand direction (in the drawings), and at this time since the open end of the second cylindrical portion 22 is held against the car body panel 11, the second cylindrical portion 22 begins to be deformed in such a manner that its inner peripheral surface, which is originally the outer peripheral surface, is inverted.

The groove 24 in the second cylindrical portion 22 is deformed into a generally triangular-shape, and the conical surface of the engagement portion 26 is pressed against the car body panel 11, so that the flange portion 25, reduced in diameter, is deformed into a tapering, cylindrical shape, and its end portion of a smaller diameter is guided into the mounting hole 12.

As the grommet 10 is pulled through the mounting hole 12, an external force to change the angle of projection of the flange portion 25 from the second cylindrical portion 22 is exerted on the flange portion 25.

Figure 6:
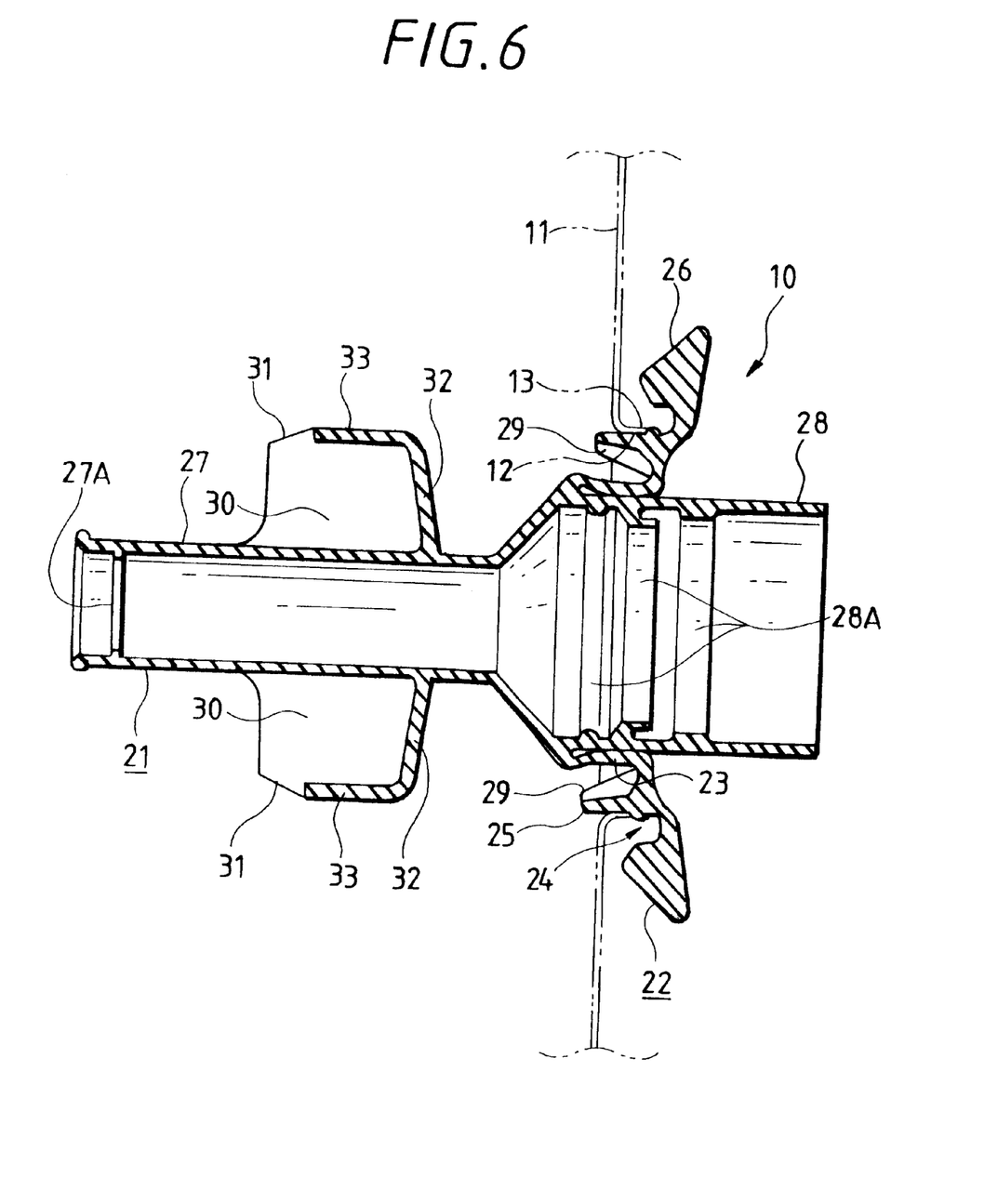
FIG. 6 is a cross-sectional view showing the procedure of mounting the grommet of the first embodiment.

As shown in FIG. 6, in this condition, when the wire harness is further pulled in the left-hand direction (in the drawings), the connection portion 23 is deformed into close contact with the outer peripheral surface of the larger-diameter portion 28 so that the flange portion 25, deformed into a cylindrical shape, can pass through the mounting hole 12.

As a result, the flange portion 25 passes through the mounting hole 12. At this time, the second cylindrical portion 22 is deformed to be spread toward the open end thereof, and therefore the engagement portion 26 is disengaged from the car body panel 11, and the groove 24 is restored into a generally channel-shaped cross-section.

Thereafter, the wire harness is further pulled in the left-hand direction (in the drawings), and when the flange portion 25 is moved into a predetermined position, a high resilient force, tending to restore the angle of projection of the flange portion 25 from the second cylindrical portion 22 into the initial angle, is released.

Figure 7:
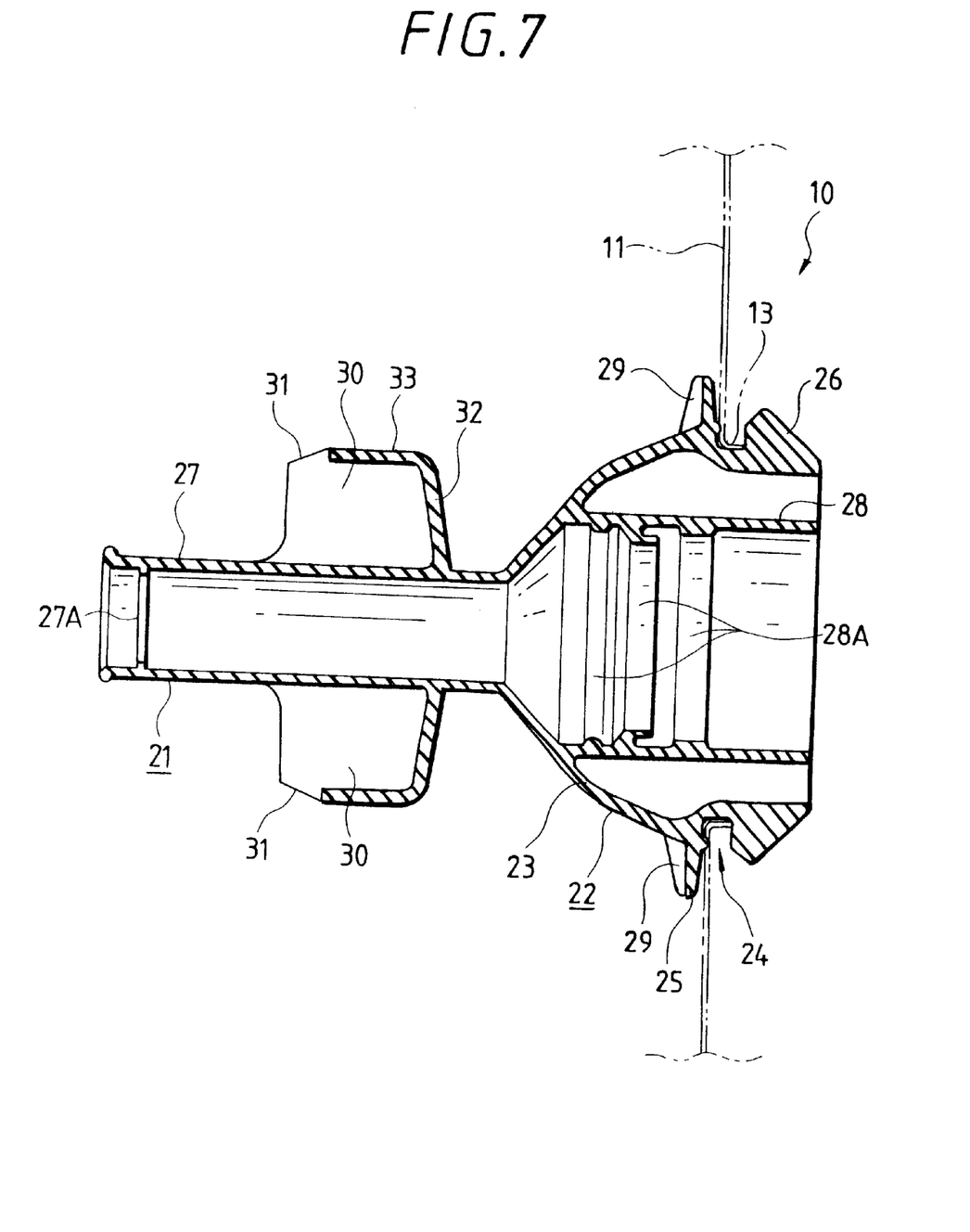
FIG. 7 is a cross-sectional view showing the mounting the grommet of the first embodiment.

Since the flange portion 25 is restored into its initial shape as shown in FIG. 7, it passes through the mounting hole 12 to be spread, and therefore the grommet 10 moves left (in the drawings) by itself, and the groove 24 is fitted on the flange 13 of the mounting hole 12.

In this grommet 10, the plurality of guide portions 30 extend radially from the outer peripheral surface of the first cylindrical portion 21, and therefore the second cylindrical portion 22 can be positively disposed coaxially with the mounting hole 12, thereby eliminating the possibility that the groove 24 is not fitted properly to the mounting hole 12 with respect to the inner peripheral edge of the mounting hole 12.

In this grommet 10, each of the guide portions 30 has a plate-like shape, and is parallel to the central axis of the first cylindrical portion 21, and therefore the guide portions can have a level of strength so that they will not be easily deformed and the first cylindrical portion 21 can be positively disposed coaxially with the mounting hole 12.

In this grommet 10, the guide portions 30 are interconnected through the disk portion 32 and the annular portion 33 which correspond to the mounting hole 12, to further increase their strength.

Also, the guide portions 30 taper toward the open end of the first cylindrical portion 21, and therefore can be easily fitted into the mounting hole 12, and the first cylindrical portion 21 can be positively disposed coaxially with the mounting hole 12.

In this grommet 10, the engagement portion 26 is formed on the outer peripheral surface of the second cylindrical portion 22, and is tapered from the groove 24 toward the open end of the second cylindrical portion 22. Therefore, by fitting the inverted second cylindrical portion 22 on the flange 13 of the mounting hole 12, the second cylindrical portion 22 can be disposed coaxially with the mounting hole 12, and therefore the groove 24 can be fitted uniformly relative to the mounting hole 12.

In the grommet 10, the recesses 29 are formed radially on the end surface of the flange portion 25, and therefore when the second cylindrical portion 22 is inverted, the flange portion 25 is reduced in diameter, that is, formed into a tapering cylindrical shape, while forming regular radial wrinkles on the flange portion 25. Therefore, the open end of the second cylindrical portion 22 can be easily passed through the mounting hole 12, and the efficiency of the operation can be enhanced as compared with the conventional construction.

In this grommet 10, the flange portion 25 is formed continuously in the circumferential direction, and therefore a sufficient resilient force to restore the second cylindrical portion 22 into its initial shape develops in the flange portion 25, and therefore the mounting operation can be carried out easily as compared with the conventional construction.

In this grommet 10, since the sufficient resilient force can be produced in the flange portion 25, the diameter of the flange portion 25 does not need to be substantially increased, and therefore the area of that portion of the car body 11, occupied by this flange portion, can be made small.

In the grommet 10, the recesses 29 are provided at that end surface of the flange portion 25 directed toward the connection portion 23, and therefore the opposite end surface thereof is made flat, and with this construction, an unnecessary gap is not formed between this flange portion and the car body panel 11, and therefore waterproof, sound-insulating and heat-insulating properties are not adversely affected.

Each of the recesses 29 in the flange portion 25 has a rectangular cross-section, and therefore the minimum thickness of the flange portion 25 can be made uniform, and when the second cylindrical portion 22 is inverted, the bottom surface 29A of each recess 29 is bent or deformed into a mountain-like configuration, so that this flange portion is easily and positively reduced in diameter uniformly.

In this grommet 10, the engagement portion 26 is formed on the outer peripheral surface of the second cylindrical portion 22, and is tapered from the groove 24 toward the open end of the second cylindrical portion 22. Therefore, by fitting the inverted second cylindrical portion 22 on the flange 13 of the mounting hole 12, the second cylindrical portion 22 can be disposed coaxially with the mounting hole 12, and therefore the groove 24 can be fitted uniformly relative to the mounting hole 12.

Figure 8A:
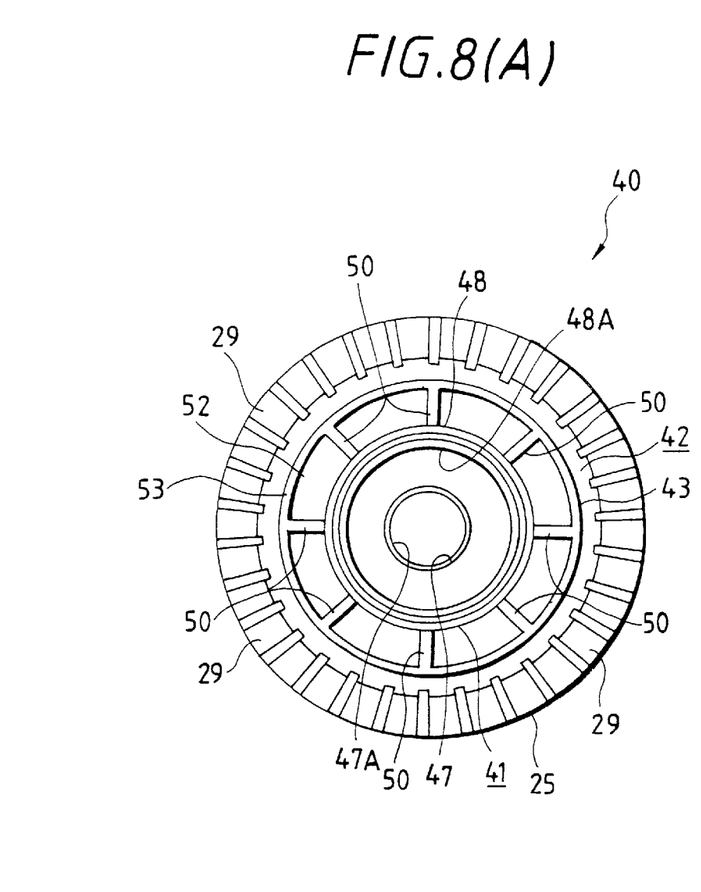
FIGS. 8(A) and (B) are a plan view and a cross-sectional view, respectively, of a grommet of a second embodiment.
Figure 8B:
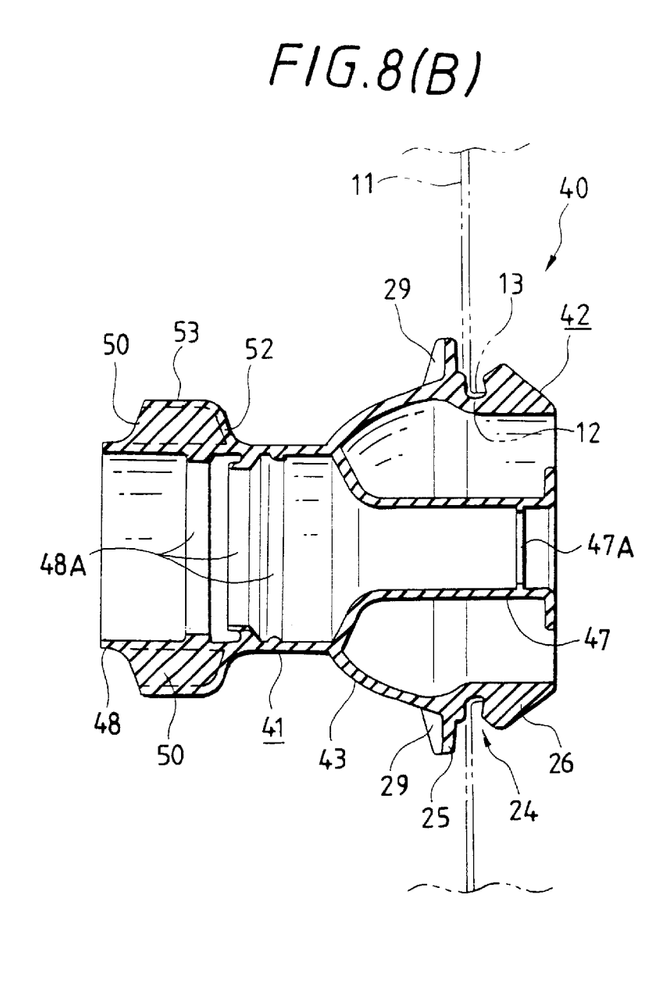
Figure 9:
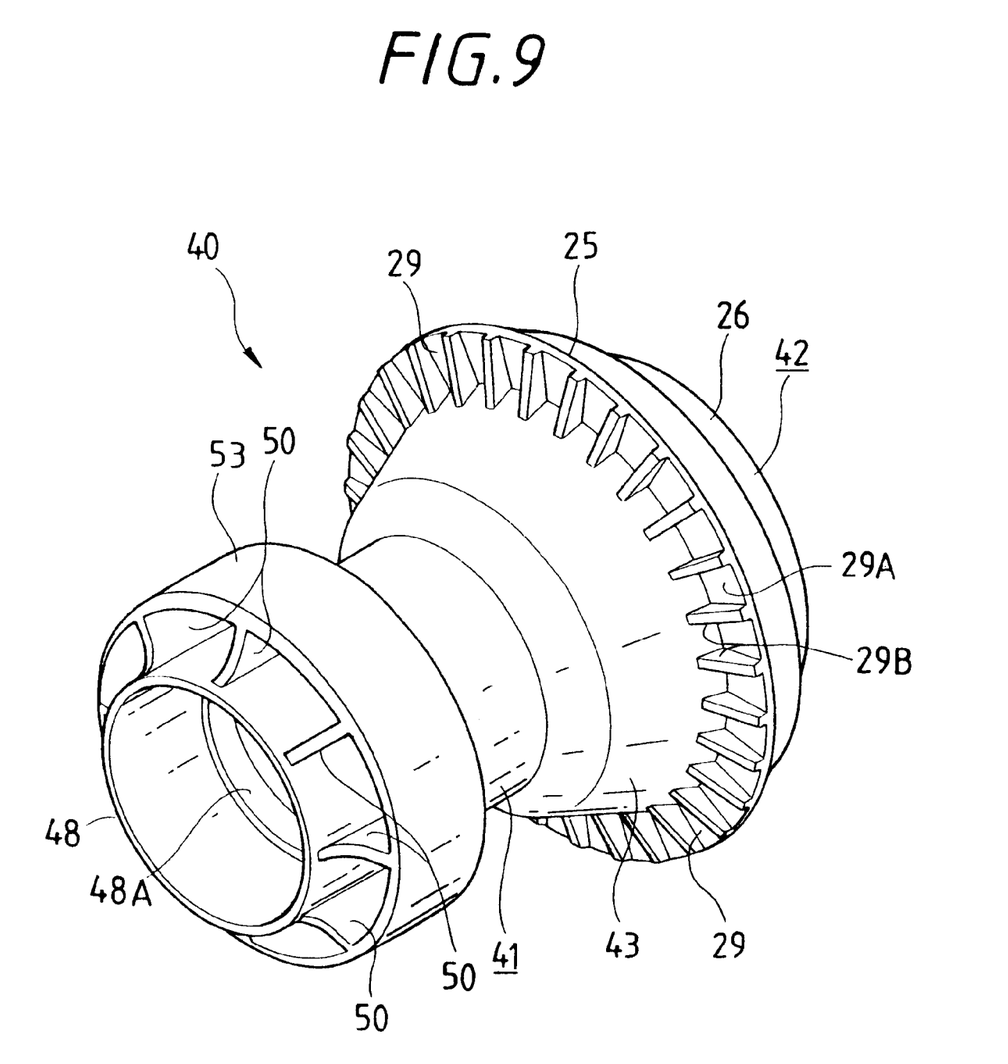
FIG. 9 is a perspective view showing the grommet of the second embodiment.
Figure 10:
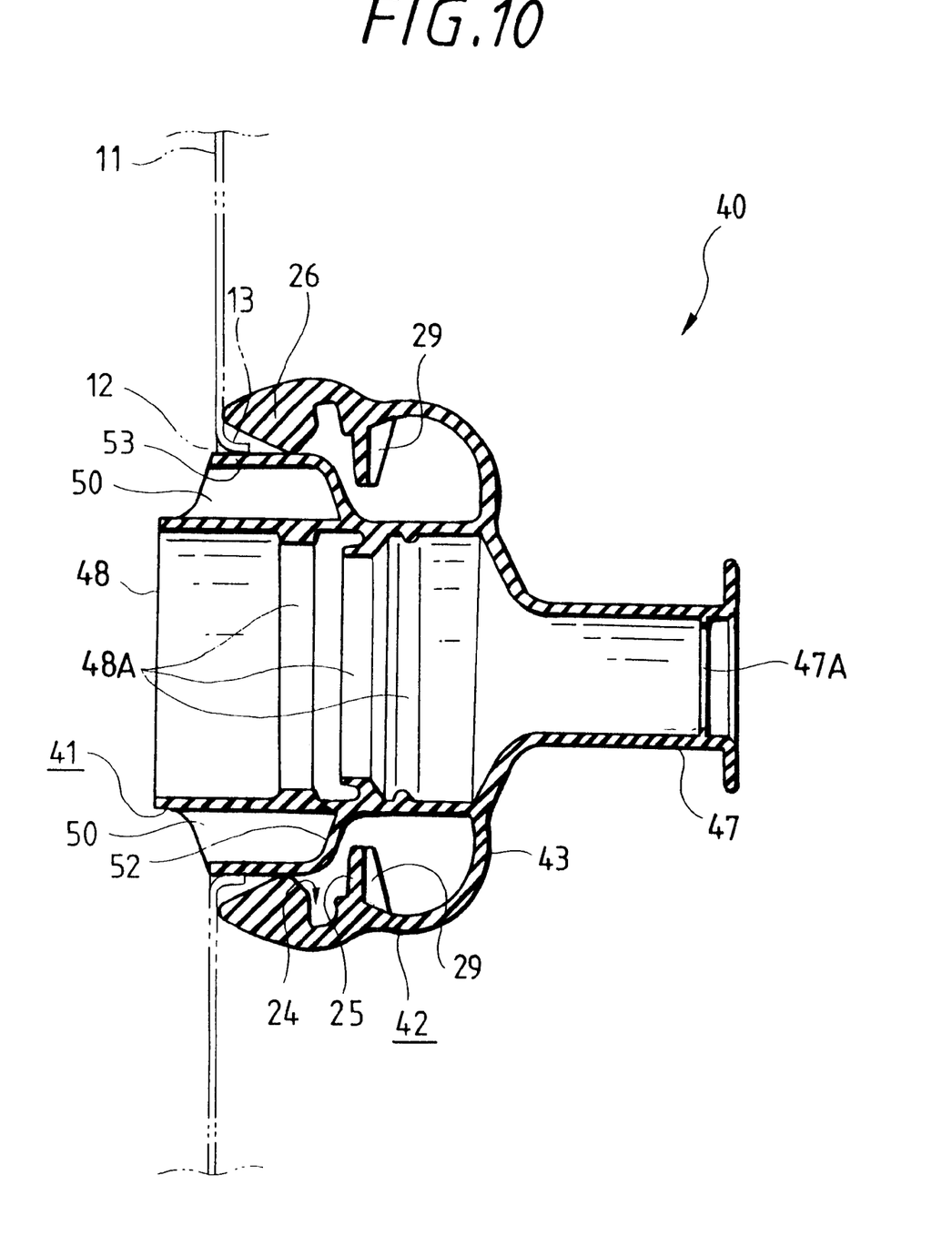
FIG. 10 is a cross-sectional view showing the procedure of mounting the grommet of the second embodiment.

FIGS. 8 to 10 show the second embodiment of the grommet 40 of the present invention.

In the embodiment to be described below, those portions, already described for FIGS. 1 to 7, will be designated by identical or like reference numerals, respectively, and explanation thereof will be simplified or omitted.

Referring to FIGS. 8(A) and 8(B), grommet 40 includes a first cylindrical portion 41 for passing a wire harness therethrough, a connection portion 43 of a generally conical shape formed on an outer peripheral surface of the first cylindrical portion 41, a second cylindrical portion 42 connected to the first cylindrical portion 41 through the connection portion 43, a groove 24 formed in an outer peripheral surface of the second cylindrical portion 42, a flange portion 25 formed on the outer peripheral surface of the second cylindrical portion 42, and an engagement portion 26 formed on that portion of the outer peripheral surface of the second cylindrical portion 42 disposed adjacent to an open end thereof.

A smaller-diameter portion 47 and a larger-diameter portion 48 are continuous with each other along a common axis, and this grommet 40 differs from the first embodiment in that the smaller-diameter portion 47 is provided within the second cylindrical portion 42.

In this grommet 40, eight guide portions 50 extend radially from the outer peripheral surface of the first cylindrical portion 41, and each of these guide portions has a plate-like shape, and is disposed parallel to the axis of the first cylindrical portion 41. These guide portions 50 are spaced 45 degrees from one another in a direction of the circumference of the first cylindrical portion 41.

These guide portions 50 have the same length in the radial direction, and are interconnected through a disk portion 52 and an annular portion 53 which correspond to a mounting hole 12. When the guide portions 50 are brought into contact with an inner peripheral edge of the mounting hole 12 through the annular portion 53, the second cylindrical portion 42 is disposed coaxially with the mounting hole 12.

In this grommet 40, similar effects as those described above for the first embodiment can be achieved.

The third embodiment of the grommet 60 of the present invention, shown in FIG. 11, has four guide portions 70 extending radially from an outer peripheral surface of a first cylindrical portion 21. Each of the guide portions 70 has a plate-like shape, and is disposed parallel to the axis of the first cylindrical portion 21. These guide portions 70 are spaced 90 degrees from one another in a direction of the circumference of the first cylindrical portion 21, have respective chamfered portions 71 tapering or slanting toward an open end of the first cylindrical portion 21.

These guide portions 70 have the same length in the radial direction, and are interconnected through a pair of disk portions 72, 72 which correspond to a mounting hole 12. The disk portions 72, 72 are spaced a predetermined distance from each other along the axis of the first cylindrical portion 21.

In this grommet 60, when distal end surfaces 74 of the guide portions 70, as well as peripheral surfaces 75 of the disk portions 72 and 72, are brought into contact with an inner peripheral edge of the mounting hole (not shown), a second cylindrical portion 22 is disposed coaxially with this mounting hole.

In this grommet 60, similar effects as those described above for the first and second embodiments can be achieved.

In this grommet 60, since the guide portions 70 are interconnected through the pair of disk portions 72, 72 spaced the predetermined distance from each other along the axis of the first cylindrical portion 21, the strength of the guide portions 70 can be increased, and therefore the second cylindrical portion 22 can be positively positioned relative to the mounting hole.

In this grommet 60, since the disk portions 72, 72 are spaced the predetermined distance from each other along the axis of the first cylindrical portion 21, the peripheral surfaces 75 of the disk portions 72, 72 are disposed in an imaginary, common cylindrical surface.

Namely, in this grommet 60, the peripheral surfaces 75 of the disk portions 72, 72 perform substantially the same function as that of the annular portion, and therefore the provision of the annular portion, used in the first and second embodiments, can be omitted.

In the present invention, if four guide portions 90, spaced 90 degrees from one another in a direction of a circumference of a first cylindrical portion 21, have a sufficient strength to stand independently of each other, the provision of the disk portion and the annular portion may be omitted as in the fourth embodiment of the grommet 80 of the invention shown in FIG. 12.

These guide portions 90 have respective chamfered portions 91 tapering or slanting toward an open end of the first cylindrical portion 21, and distal end surfaces 94 of the guide portions 90, and when distal end surfaces 74 of the guide portions 70 are brought into contact with an inner peripheral edge of the mounting hole (not shown), a second cylindrical portion 22 is disposed coaxially with this mounting hole.

In this grommet 80, also, the desired effects can be achieved.

The present invention is not limited to the above embodiments, and various modifications and improvements can be made, and the material, shape, dimensions, configuration, number, mounting position and etc., for the mounting plate, the mounting hole, the first cylindrical portion, the connection portion, the second cylindrical portion, the groove, the flange portion, the engagement portion, the guide portions, the disk portion, the annular portion and so on are arbitrary, and are not limited in so far as the present invention can be achieved.

As described above, in the present invention, the plurality of guide portions extend radially from the outer peripheral surface of the first cylindrical portion, and therefore the second cylindrical portion can be positively disposed coaxially with the mounting hole, so that the groove will not be improperly fitted on the inner peripheral edge of the mounting hole.

In the present invention, each of the guide portions has a plate-like shape, and is disposed parallel to the axis of the first cylindrical portion. Therefore, the guide portions can have the required strength, and will not be easily deformed so that the first cylindrical portion can be positively disposed coaxially with the mounting hole.

In the present invention, the guide portions are interconnected through the disk portion, or are interconnected through the annular portion, and therefore the strength can be further increased.

In the present invention, the guide portions are tapered toward the open end of the first cylindrical portion, and therefore the guide portions can be easily inserted into the mounting hole, and the first cylindrical portion can be positively disposed coaxially with the mounting hole.

In the present invention, the engagement portion is formed on the outer peripheral surface of the second cylindrical portion, and is tapered from the groove to the distal end of the second cylindrical portion. Therefore, when the inverted second cylindrical portion is fitted on the flange of the mounting hole, the cylindrical portion can be held coaxially with the mounting hole.

What is claimed is:

1. A grommet for passing and holding a member relative to a mounting hole formed in a mounting plate, comprising:
   a first cylindrical portion which is adapted to receive the member therethrough;
   a second cylindrical portion, connected to said first cylindrical portion by an annular connection portion, which is formed on an outer peripheral surface of said first cylindrical portion;
   a groove portion formed in an outer peripheral surface of said second cylindrical portion;
   a flange portion formed on a portion of the outer peripheral surface of said second cylindrical portion located between said groove portion and said connection portion; and
   a plurality of guide portions which extend radially from the outer peripheral surface of said first cylindrical portion, wherein said plurality of guide portions contact an inner peripheral edge of said mounting hole to coaxially dispose said second cylindrical portion with said mounting hole,
   wherein an inner peripheral surface of said second cylindrical portion is directed outwardly, and a peripheral edge portion of said flange portion is adapted to be inserted into said mounting hole and said first cylindrical portion is adapted to be passed through said mounting hole, and said second cylindrical portion is restored to an initial shape, so that said groove portion of said second cylindrical portion is adapted to be fitted on an inner peripheral edge of said mounting hole.

2. A grommet according to claim 1, wherein each of said guide portions has a plate-like shape, and is disposed on a plane parallel to a central axis of said first cylindrical portion.

3. A grommet according to claim 2, wherein said guide portions are interconnected through a disk portion, wherein said disk portion corresponds in size to said mounting hole.

4. A grommet according to claim 2, wherein said guide portions are interconnected through an annular portion, wherein said annular portion corresponds in size to said mounting hole.

5. A grommet according to claim 2, wherein said guide portions are tapered toward an open end of said first cylindrical portion, so as to fit easily through said mounting hole.

6. A grommet according to claim 2, wherein said guide portions are interconnected through a pair of disk portions having a diameter size which corresponds to a diameter of said mounting hole, wherein a peripheral surface of each of said pair of disk portions contact an inner peripheral edge of said mounting hole to coaxially dispose said first cylindrical portion with respect to said mounting hole.

7. A grommet according to claim 1, wherein an engagement portion is formed on the outer peripheral surface of said second cylindrical portion, and is tapered from said groove portion to a distal end of said second cylindrical portion, wherein said engagement portion contacts the mounting plate as said flange portion is inserted into said mounting hole.

8. A grommet according to claim 1, wherein a plurality of radially extending recesses are arranged on said flange and extend toward said annular connection portion, each of said plurality of recesses having a rectangular cross-section defined by a bottom surface and a pair of wall surfaces, wherein the walls of the recesses move toward each other and the bottom surface deforms, when the inner peripheral surface of the second cylindrical portion is directed outwardly.

* * * * *